Dec. 2, 1969 YUJI TAKADA ET AL 3,482,048

COMMUNICATION SYSTEM FOR TRANSMISSION OF HIGH SPEED CODE VIA LOW SPEED CHANNELS

Filed Feb. 25, 1966 5 Sheets-Sheet 1

United States Patent Office 3,482,048

Patented Dec. 2, 1969

3,482,048

COMMUNICATION SYSTEM FOR TRANSMISSION OF HIGH SPEED CODE VIA LOW SPEED CHANNELS

Yuji Takada and Katsumasa Ogawa, Kawasaki-shi, Japan, assignors to Fujitsu Limited, Kawasaki, Japan, a corporation of Japan Filed Feb. 25, 1966, Ser. No. 530,007
Claims priority, application Japan, Feb. 27, 1965, 40/11,246
Int. Cl. H04j 1/02, 3/02
U.S. Cl. 179—15 12 Claims

ABSTRACT OF THE DISCLOSURE

Transmission system of $n$ relatively low data rate channels over which are transmitted relatively high data rate signals distributed in all but two of the channels, and wherein the first of these two channels occasionally carries data, and the other of the two channels carries a signal designating whether the first is carrying data at any given time.

The present invention relates to a communication system for the transmission of high speed code via low speed channels. More particularly, the invention relates to a communication system for the transmission of high speed binary code via a plurality of low speed signal channels.

In a communication system for the transmission of high speed binary code via a plurality of low speed signal channels, the input speed of the data may be designated $a$ and the output speed of the data may be designated $b$, $a$ being greater than $b$. The speeds $a$ and $b$ may each be indicated in bauds which is the number of code elements per second; a baud being a unit of signaling speed derived from the duration of the shortest code element. When the input speed of the data is $a$ and the output speed of the data is $b$ and the data at the speed $b$ is to be transmitted via $n$ channels, the equation $$a=nb \tag{1}$$

must be satisfied. When the Equation 1 is satisfied, the parallel transmission of the data via a plurality of $n$ channels may be achieved by applying the input signals $a$ to a shift register or the like in the transmitter in order to distribute said input signals to $n$ channels sequentially and the reception of the transmitted signals may be accomplished by scanning said transmitted signals at the receiver in the same sequence. In the various types of communications systems which operate on this principle, either the Equation 1 is satisfied or a redundancy element is added to the system so that said equation may be satisfied. If the Equation 1 is not satisfied, due, for example, to the synchronization of the transmitter and the nonsynchronization of the receiver and the failure to add a redundancy element, some code elements overlap and some code elements are bypassed and unnecessary data may be added to some code elements to produce erroneous results.

The principal object of the present invention is to provide a new and improved communication system for the transmission of high speed code via low speed channels. The communication system of the present invention transmits high speed binary code via a plurality of low speed channels, when $a \neq nb$, and reconverts the transmitted signals to the high speed binary code at the receiver, without error and with efficiency and reliability. Furthermore, the communication system of the present invention is simple, compact and economical in manufacture.

In accordance with the present invention, a communication system for the transmission of a high speed code via a plurality of low speed signal channels comprises a transmitter for transmitting high speed data signals in a plurality of low speed signal channels selected in accordance with the equation $$[b(n-2)]<a<[b(n-1)]$$

In this equation, $a$ is the speed in bauds of the high speed data signals, $b$ is the speed in bauds of the low speed signals and $n$ is the number of channels of transmission. Intelligence data is transmitted in $(n-2)$ of the channels. Intelligence data is selectively transmitted in the $(n-1)^{th}$ of the channels. Indicating signals indicating the transmission of intelligence data in the $(n-1)^{th}$ channel are transmitted in the $n^{th}$ of the channels. The communication system of the present invention further comprises the application to the transmitter of high speed clock pulses at the speed of the high speed data signals and the application to the transmitter of low speed clock pulses at the speed of the low speed signals. In the transmitter a determined number of high speed clock pulses is provided between each low speed clock pulse and the next succeeding low speed clock pulse and a counter counts the determined number of high speed clock pulses. The counter is connected to and controls the means for the selective transmission of intelligence data in accordance with the determined number of high speed clock pulses. In one of the embodiments of the invention, the counter of the transmitter comprises a counter, a delay device connected to the counter and means for applying the low speed clock pulses to the counter through the delay device.

In accordance with the present invention, the communication system further comprises a receiver for receiving the high speed data signals transmitted by the transmitter in the plurality of low speed signal channels and reproducing the high speed data signals therefrom. Low speed clock pulses at the speed of the low speed signals are applied to the receiver. The receiver includes a first frequency multiplier for multiplying the speed of the low speed clock pulses by a first factor to provide a first clock pulse at a first frequencey. A second frequency multiplier multiplies the speed of the low speed clock pulses by a second factor to provide a second clock pulse at a second frequency. A signal reproducer reproduces the high speed data signals from the signals received from the transmitter. A switch connected between the first and second frequency multipliers and the signal reproducer receives the $n^{th}$ channel indicating signals from the transmitter and selects and applies to the signal reproducer one of the first and second clock pulses to reproduce the high speed data signals in accordance with the indicating signals.

In accordance with the present invention, a communication system for the transmission of a high speed code via a plurality of low speed signal channels comprises, in another embodiment, a transmitter for transmitting high speed data signals in a plurality of low speed signal channels selected in accordance with the equation $$[b(n-3)]<a<[b(n-1)]$$

The transmitter transmits intelligence data in $(n-3)$ of the channels. The intelligence data is selectively transmitted in the $(n-2)^{th}$ and in the $(n-1)^{th}$ of the channels. The transmitter includes means for transmitting in the $n^{th}$ of the channels indicating signals indicating the transmission of intelligence data in the $(n-2)^{th}$ and $(n-1)^{th}$ channels.

In order that the present invention may be readily carried into effect, it will now be described with reference to the accompanying drawings, wherein.

Figure 1:
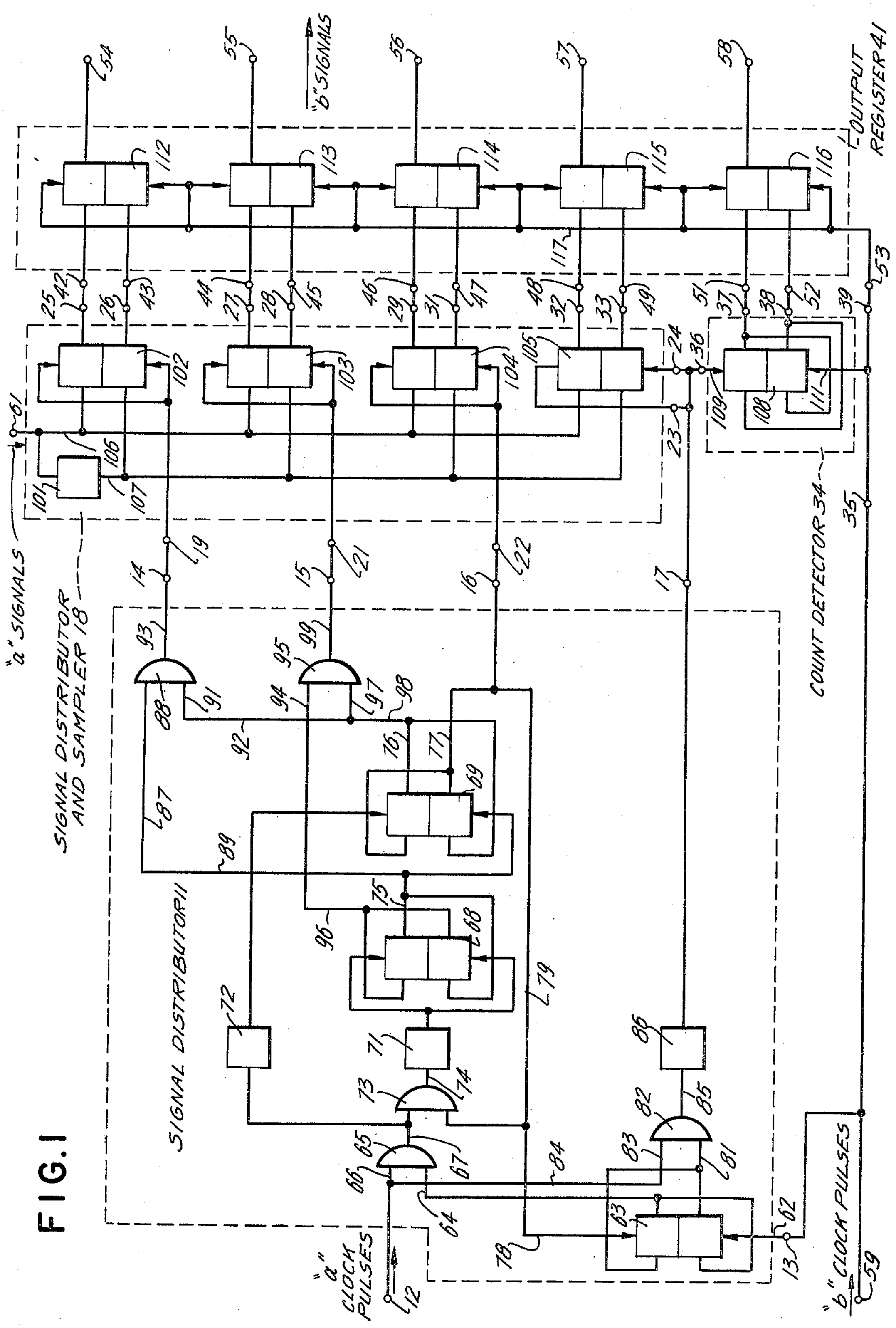
FIG. 1 is a block diagram of an embodiment of a transmitter of the communication system of the present invention.

In accordance with the present invention, if the speed $a$ of the input data to the transmitter is known and if the speed $b$ of the output data from the transmitter is known, the number of channels $n$ utilized for transmission is determined by the equation $$[b(n-2)]<a<[b(n-1)] \quad (2)$$

Of the $n$ channels, $(n-2)$ channels, or channels 1 through $(n-2)$, are utilized for the transmission of data, intelligence or information. One of the remaining two channels such as, for example, channel $(n-1)$, is utilized as a reserve information channel which is utilized occasionally for the transmission of data in accordance with a determined condition. The last remaining channel such as, for example, channel $n$, is utilized for the transmission of a signal which indicates the condition of channel $(n-1)$.

Since $n$ is selected to satisfy the Equation 2, if the data is transmitted via $(n-2)$ channels, one of the channels remains unused, whereas if the data is transmitted via $(n-1)$ channels, extraneous data may be added to the data transmitted via one of the channels. Thus, the data is preferably transmitted via $(n-2)$ channels, and when the output of the transmitter is delayed relative to the input, the data is transmitted via $(n-1)$ channels. However, when the output of the transmitter is advanced relative to the input, the data is transmitted via $(n-2)$ channels.

The relation between the transmitter input speed and the transmitter output speed is adjusted by the occasional use of the channel $(n-1)$. However, since the transmitted data in each channel normally comprises only two components, signal and no signal, the receiver connot determine whether the data was transmitted via all the data channels, 1 through $(n-1)$, or only via the channels 1 through $(n-2)$. Thus, channel $n$ transmits a signal which indicates whether or not data is transmitted via the channel $(n-1)$. The receiver receives the transmitted channels and scans them in the order in which they are transmitted, to exclude extraneous data. The communication system of the present invention thus functions efficiently and reliably although the equation 1 is not satisfied.

If, for example, the relation of speeds $a$ and $b$ is $$a=b(n-2) \quad (3)$$

and the input speed $a$ varies, it is impossible for the communication system to operate without error. In this case, the relation of speeds $a$ and $b$ should be $$[b(n-3)]<a<[b(n-1)] \quad (4)$$

instead of that set forth in the Equation 2. The operation of the system in accordance with the Equation 4 is the same as it is in accordance with the Equation 2, except that in operation in accordance with the equation 4 the channel $n$ transmits a signal which indicates whether or not the channels $(n-2)$ and $(n-1)$ are utilized simultaneously.

In order to describe the communication system of the present invention and its operation, it is assumed that the input speed $a$ to the transmitter is 350 bauds, the output speed $b$ from the transmitter is 100 bauds and the number $n$ of channels is 5.

In FIG. 1, the transmitter comprises a signal distributor 11 which has inputs 12 and 13 and outputs 14, 15, 16 and 17. A signal distributor and sampler 18 has inputs 19, 21, 22, 23 and 24 and outputs 25, 26, 27, 28, 29, 31, 32 and 33. The inputs 19, 21 and 22, respectively, of the signal distributor and sampler 18 are connected to the outputs 14, 15 and 16, respectively, of the signal distributor 11, and the inputs 23 and 24 of said signal distributor and sampler are connected to the output 17 of said signal distributor. A count detector 34 has inputs 35 and 36 and outputs 37, 38 and 39. The input 36 of the count detector 34 is connected to the output 17 of the signal distributor 11. An output register 41 has inputs 42, 43, 44, 45, 46, 47, 48 and 49, respectively, connected to the outputs 25, 26, 27, 28 29, 31, 32 and 33, respectively, of the signal distributor and sample 18, inputs 51, 52 and 53, respectively, connected to the outputs 37, 38 and 39, respectively, of the count detector 34 and outputs 54, 55, 56, 57 and 58.

Clock pulses for the high speed binary code signals $a$ are supplied to the transmitter via the input terminal 12 of the signal distributor 11. The signals $a$ are assumed to have a speed of 350 bauds or pulses per second. Clock pulses for the low speed signals $b$ are supplied to the transmitter via an input terminal 59 connected to the input terminal 13 of the signal distributor 11 and the input terminal 35 of the count detector 34. The signals $b$ are assumed to have a speed of 100 bauds or pulses per second. The $a$ signals themselves are supplied to the transmitter at 350 bauds to an input terminal 61 of the signal distributor and sampler 18. The transmitted signals at 100 bauds are provided at the output terminals 54, 55, 56, 57 and 58. Each of these output terminals corresponds to a different one of the five channels and each provides 100 baud signals converted from the 350 baud signals.

Figure 3:
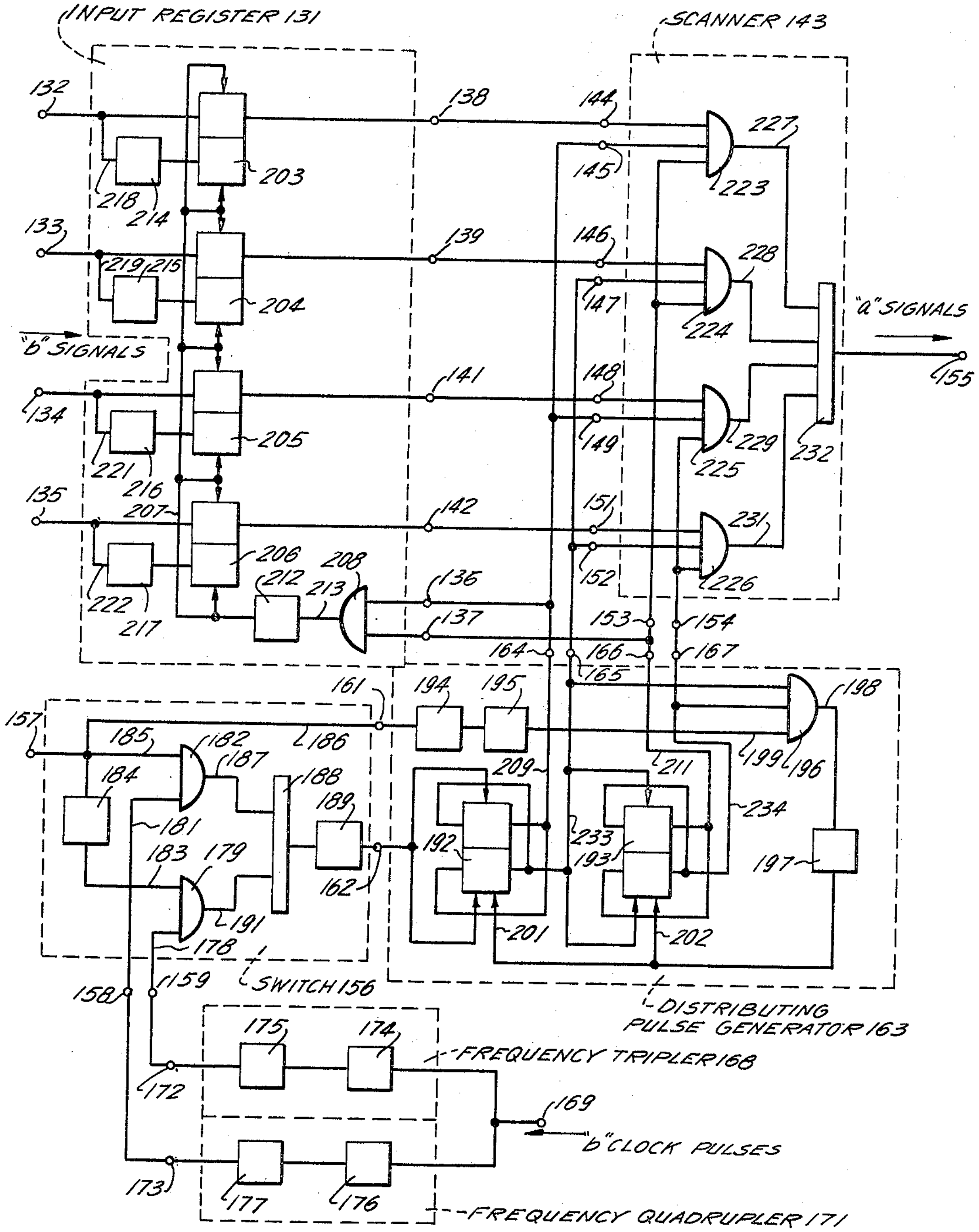
FIG. 3 is a block diagram of an embodiment of a receiver of the communication system of the present invention.
Figure 5:
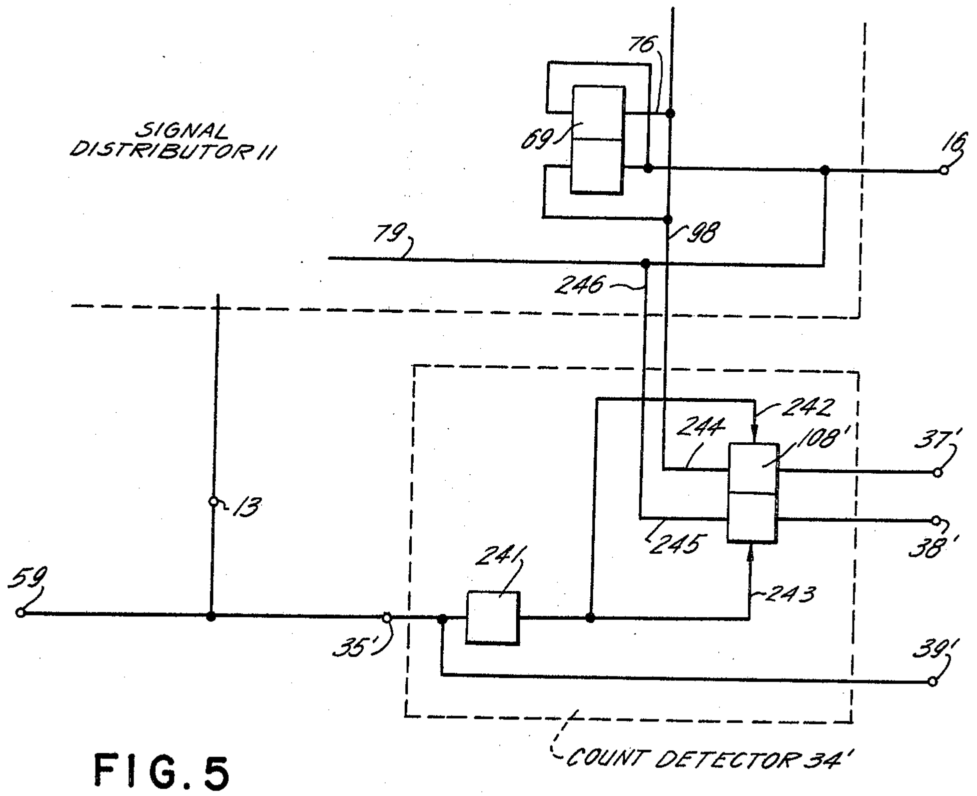
FIG. 5 is a block diagram of another embodiment of the count detector 34 of the transmitter of the communication system of the present invention.

The logical circuits of FIGS. 1, 3 and 5 are positive logical circuits and the flip-flop circuits thereof are triggered by negative trigger pulses.

Figure 2:
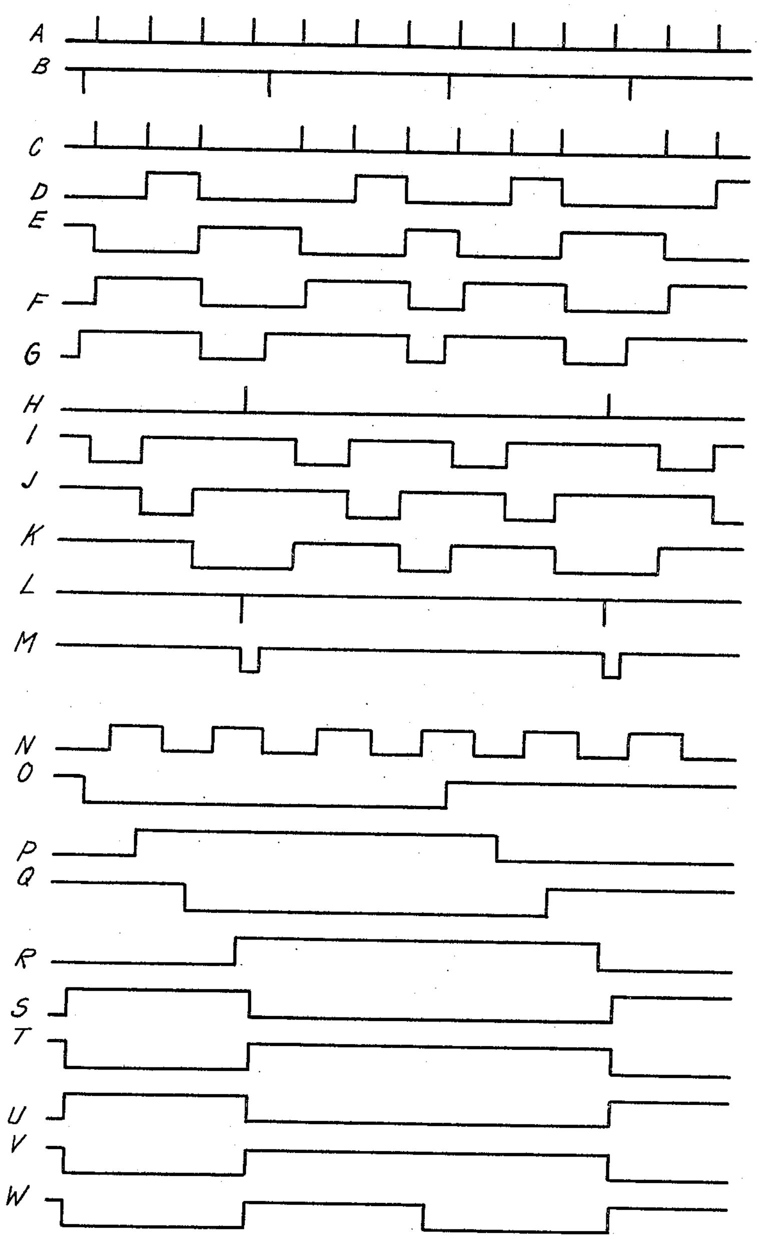
FIG. 2 is a graphical presentation of various waveforms appearing in the transmitter of FIG. 1.

The 350 pulse per second clock pulses supplied to the terminal 12 are illustrated by curve A of FIG. 2. The 100 pulse per second clock pulses supplied to the input terminals 13 and 35 are illustrated by curve B of FIG. 2. The $b$ clock pulses supplied to the input terminal 13 are supplied to the reset input 62 of a flip-flop 63 and thus reset said flip-flop. When the flip-flop 63 is reset, it supplies an output signal to an input 64 of an AND gate 65. Since the $a$ clock pulses supplied to the input terminal 12 are supplied to the other input 66 of the AND gate 65, said AND gate is made conductive and provides an output signal at its output 67.

The output signal provided by the AND gate 65 comprises 3 pulses at 350 pulses per second, as illustrated by curve C of FIG. 2, and is fed to a ternary counter comprising a pair of flip-flops 68 and 69 coupled to each other, a pair of polarity inverters 71 and 72 and an AND gate 73 having an output 74 connected to the flip-flop 68 via the inverter 71 and an input connected to the output 67 of the AND gate 65 and to the set input of the flip-flop 69 via the inverter 72. The ternary counter operates to count the pulses fed to it and the waveform shown by curve D of FIG. 2 is produced at the set output 75 of the flip-flop 68. The waveform shown by curve E of FIG. 2 is produced at the set output 76 of the flip-flop 69.

When the ternary counter of the signal distributor 11 has counted the third pulse provided by the AND gate 65, the flip-flop 69 thereof produces the waveform illustrated by curve F of FIG. 2 at its reset output 77. The reset output of the flip-flop 69 is connected to the set input 78 of the flip-flop 63 via a lead 79, so that the reset output waveform of the flip-flop 69 sets the flip-flop 63. When the flip-flop 63 is set, it supplies an output signal from its set output to an input 81 of an AND gate 82. Since the reset output signal of the flip-flop 63 is then cut off, the AND gate 65 is made nonconductive and the output signal at its output 67 is cut off. Since the *a* clock pulses supplied to the inut terminal 12 are supplied to the outer input 83 of the AND gate 82 via a lead 84, said AND gate is made conductive and provides an output signal at its output 85.

The set output waveform of the flip-flop 63 is shown by the curve G of FIG. 2. The waveform provided at the output 85 of the AND gate 82 is illustrated by the curve H of FIG. 2 and comprises one pulse at 350 pulses per second. The output signal at the output 85 of the AND gate 82 is fed to a polarity inverter 86 which produces the waveform, shown by curve L of FIG. 2, which is the fourth pulse provided. Since the set output 75 of the flip-flop 68 is connected to an input 87 of an AND gate 88 via a lead 89 and the set output 76 of the flip-flop 69 is connected to the other input 91 of the AND gate 88 via a lead 92, said AND gate is made conductive and provides an output signal, shown by the curve I of FIG. 2, at its output 93 and at the output terminal 14. Since the reset output of the flip-flop 68 is connected to an input 94 of an AND gate 95 via a lead 96 and the set output of the flip-flop 69 is connected to the other input 97 of the AND gate 95 via a lead 98, said AND gate is made conductive and provides an output signal, shown by the curve J of FIG. 2, at is output 99 and at the output terminal 15. The reset output signal of the flip-flop 69 is shown by the curve K of FIG. 2.

The output signal in the output 93 of the AND gate 88 is the first count output, the output signal in the output 99 of the AND gate 95 is the second count output, the reset output signal of the flip-flop 69 is the third count output and the output signal at the output of he inverter 86 is the fourth count output. Thus, the 350 pulses per second of the high speed data signal *a* are distributed to four channels, represented by four counts. The reset output signal of the flip-flop 69, which is the third count output, is provided at the output terminal 16. The fourth count output is provided at the output terminal 17.

As illustrated by the curves of FIG. 2, either 3 or 4 clock pulses of the 350 pulses per second clock pulses are provided between adjacent clock pulses of the 100 pulse per second clock pulses. If three 350 pulse clock pulses are provided between adjacent 100 pulse clock pulses, the flip-flop 63 is reset before 350 pulse clock pulses are conducted through the AND gate 82 so that the said 350 pulse clock pulses are distributed only to the three channels represented by the output terminals 14, 15 and 16. If four 350 pulse clock pulses are provided between adjacent 100 pulse clock pulses, the flip-flop 63 is reset after the 350 pulse clock pulses are conducted through the AND gate 82 so that the said 350 pulse clock pulses are distributed to all four channels represented by the output terminals 14, 15, 16 and 17. This determines whether or not the fourth channel is utilized.

The 350 pulse per second data signals *a* are supplied to the signal distributor and sampler 18 via the input terminal 61. The 350 pulse signals are inverted in polarity by a polarity inverter 101 and are supplied in their initial polarity to the set inputs of flip-flops 102, 103, 104 and 105 via a lead 106 and are supplied in their inverted polarity to the reset inputs of said flip-flops via a lead 107 from said inverter. The distributing pulses produced by the signal distributor 11 and provided at the output terminals 14, 15, 16 and 17 and the corresponding input terminals 19, 21, 22 and 23 and 24 are utilized to sample the 350 pulse signals. The results of the sampling are stored in the flip-flops 102, 103, 104 and 105.

When the signal distributor 11 distributes the clock pulses to only three channels, there is no sampling in the flip-flop 105. There is sampling in the flip-flop 105 only when the clock pulses are distributed to four channels. The curve N of FIG. 2 illustrates the 350 baud input signals at the input terminal 61. The curve O of FIG. 2 shows the set output signal of the flip-flop 102 which is fed to the first channel via the output terminal 25. The curve P of FIG. 2 shows the set output signal of the flip-flop 103 which is fed to the second channel via the output terminal 27. The curve Q of FIG. 2 shows the set output signal of the flip-flop 104 which is fed to the third channel via the output terminal 29. The curve R of FIG. 2 illustrates the set output signal of the flip-flop 105 which is fed to the fourth channel via the output terminal 32.

The count detector 34 comprises a flip-flop 108 which determines whether or not the fourth channel is utilized. When the fourth channel is utilized, a sampling clock pulse is supplied to the flip-flop 105 via the input terminals 23 and 24. The same sampling clock pulse supplied to the flip-flop 105 is supplied to the set input 109 of the flip-flop 108 via the input terminal 36 and sets the flip-flop 108. Thus, when the flip-flop 108 is set, it indicates that the fourth channel is utilized by producing a set output, as illustrated by the curve M of FIG. 2. After the content of the flip-flop 108 is supplied to the output register 41, it is reset by the 100 pulse per second clock pulses supplied to its reset input 111 via the input terminal 35.

The 100 pulse per second clock pulses supplied to the count detector 34 via the input terminal 35 are provided at the output terminal 39 and are therefore fed to the output register 41 via the input terminal 53. The 100 pulse per second clock pulses at the input terminal 53 are supplied to the set and reset inputs of flip-flops 112, 113, 114, 115 and 116 via a lead 117. The set outputs of the flip-flops 112, 113, 114, 115 and 116, respectively, are connected to the output terminals 54, 55, 56, 57 and 58, respectively. The contents of the flip-flops 102, 103, 104, 105 and 108 are thus shifted and stored in the output register 41 by the 100 pulse per second clock pulses.

The contents stored in the flip-flops 112, 113, 114, 115 and 116 of the output register 41 are transmitted from the output terminals 54, 55, 56, 57 and 58, respectively, in the corresponding five channels. The 350 baud signals are thus transmitted via the three channels corresponding to the output terminals 54, 55 and 56, or via the four channels corresponding to the output terminals 54, 55, 56 and 57, as 100 baud signals. The signals transmitted via the fifth channel, corresponding to the output terminal 58, indicate whether or not the fourth channel is utilized for transmission. The 100 baud signals transmitted in the first channel via the output terminal 54 are shown by curve S of FIG. 2. The 100 baud signals transmitted in the second channel via the output terminal 55 are shown by curve T of FIG. 2. The 100 baud signals transmitted in the third channel via the output terminal 56 are shown by curve U of FIG. 2. The 100 baud signals transmitted in the fourth channel via the output terminals 57 are shown by curve V of FIG. 2. The indication signals transmitted in the fifth channel via the output terminal 58 are shown by curve W of FIG. 2.

In FIG. 3, the receiver comprises an input register 131 which has inputs 132, 133, 134, 135, 136 and 137 and outputs 138, 139, 141 and 142. A scanner 143 has inputs 144, 145, 146, 147, 148, 149, 151, 152, 153 and 154 and an output 155. The inputs 144, 146, 148 and 151 respectively, of the scanner 143 are connected to the outputs 138, 139, 141 and 142, respectively, of the input register 131. A switch 156 has inputs 157, 158 and 159 and outputs 161 and 162. A distributing pulse generator 163 has inputs 161 and 162, which are the same as the outputs 161 and 162 of the switch 156, and outputs 164, 165, 166 and 167. The inputs 145 and 159 of the scanner 143 and the input 36 of the input register 131 are connected to the output 164 of the distributing pulse generator 163. The inputs 147 and 152 of the scanner 143 are connected to the output 165 of the distributing pulse generator 163. The input 137 of the input register 131 and the input 153 of the scanner 143 are connected to the output 166 of the distributing pulse generator 163. The input 154 of the scanner 143 is connected to the output 167 of the distributing pulse generator 163. A frequency tripler 168 has an input 169 which it utilizes in common with a frequency quadrupler 171. The frequency tripler 168 has an output 172 connected to the input 159 of the switch 156 and the frequency quadrupler 171 has an output 173 connected to the input 158 of said switch.

The 100 pulse per second signals transmitted in the first, second, third, fourth and fifth channels, respectively, are received at the input terminals 132, 133, 134, 135 and 157, respectively. Clock pulses for the low speed signals *b* are supplied to the receiver via the input terminal 169 of the frequency tripler and quadrupler 168 and 171. The high speed binary code signals *a* are provided by the receiver at the output terminal 155 of the scanner 143, after reconversion from 100 bauds to 350 bauds.

The frequency tripler 168 comprises a frequency tripler 174 and a delay device 175 connected in series with the output of the frequency tripler. The frequency tripler 168 triples the frequency of the *b* clock pulses from 100 pulses per second to 300 pulses per second. The frequency quadrupler 171 comprises a frequency quadrupler 176 and a delay device 177 connected in series with the output of the frequency quadrupler. The frequency quadrupler 171 quadruples the frequency of the *b* clock pulses from 100 pulses per second to 400 pulses per second. The delay devices 175 and 176 function to adjust the phases of the 300 pulse per second clock pulses, shown by curve C of FIG. 4 and the 400 pulse per second clock pulses, shown by curve B of FIG. 4, to the 100 pulse per second clock pulses, shown by curve A of FIG. 4.

The phase-adjusted 300 pulse per second clock pulses provided at the output terminal 172 are supplied to an input 178 of an AND gate 179 via the input terminal 159 of the switch 156. The phase-adjusted 400 pulse per second clock pulses provided at the output terminal 173 are supplied to an input 181 of an AND gate 182 via the input terminal 158 of the switch 156. The signals transmitted via the fifth channel, which indicate whether the fourth channel is utilized for transmission, are supplied to the other input 183 of the AND gate 179 via a polarity inverter 184 and are supplied directly to the other input 185 of the AND gate 182. The indicating signals transmitted in the fifth channel are also supplied to the distributing pulse generator 163 via a lead 186 and the common terminal 161.

The switch 156 functions to select either the 300 pulse per second clock pulses or the 400 pulse per second clock pulses and transfers the selected clock pulses to the distributing pulse generator 163 via the common terminal 162. When the indicating signals transmitted in the fifth channel are positive, thereby indicating that the fourth channel is utilized for data transmission, the AND gate 182 is made conductive and the AND gate 179 is made nonconductive. The 400 pulse per second clock pulses are thus selected and are provided in the output 187 of the AND gate 182, whence they are supplied to the output terminal 162 via an OR gate 188 and a polarity inverter 189. When the indicating signals transmitted in the fifth channel are negative, thereby indicating that the fourth channel is not utilized for data transmission, the AND gate 179 is made conductive and the AND gate 182 is made nonconductive. The 300 pulse per second clock pulses are thus selected, as shown by curve E of FIG. 4, and are provided in the output 191 of the AND gate 179, whence they are supplied to the output terminal 162 via the OR gate 188 and the polarity inverter 189.

The distributing pulse generator 163 counts the clock pulses provided by the switch 156 at the output terminal 162 and distributes said clock pulses. The distributing pulse generator 163 comprises a quadrinary counter which includes two flip-flops 192 and 193. If the fifth channel indicating signal is of positive polarity so that it indicates that the fourth channel is utilized for signal transmission, it is fed to and makes the reset circuit comprising a delay device 194, a polarity inverter 195, an AND gate 196 and a polarity inverter 197 connected in the output 198 of the AND gate 196 inoperable. When the reset circuit 194, 195, 196, 197, connected to the output terminal 161, is inoperable, the distributing pulse generator 163 functions as a quadrinary counter. When the distributing pulse generator 163 functions as a quadrinary counter, it supplies the distributing pulses received at its input terminal 162, to the first, second, third and fourth channels in the scanner 143 to scan the 100 baud signals in such channels. The set output signal produced at the set output of the flip-flop 192 is shown by curve F of FIG. 4 and the set output signal produced at the set output of the flip-flop 193 is shown by curve G of FIG. 4.

If the fifth channel indicating signal is of negative polarity so that it indicates that the fourth channel is not utilized for signal transmission, it is fed to and operates the reset circuit 194, 195, 196, 197, connected to the output terminal 161, to reset the counter of the distributing pulse generator 163, and the distributing pulse generator 163 functions as a ternary counter. The indicating signals transmitted via the fifth channel are fed via the input terminal 157, the lead 186 and the output terminal 161 of the switch 156 to the delay device 194 where they are delayed for about a quarter of the duration time of a pulse. The delayed indicating signals are inverted in polarity by the polarity inverter 195 and are supplied to an input 199 of the AND gate 196 and said AND gate is thereby made conductive when the fourth channel is not utilized for signal transmission.

Figure 4:
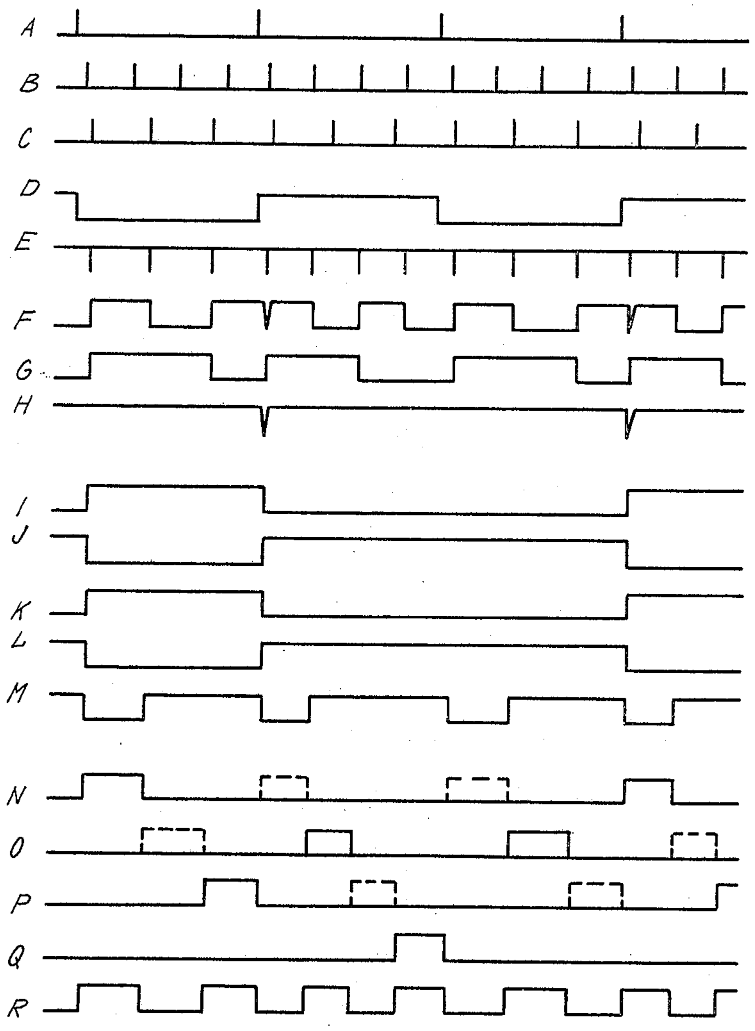
FIG. 4 is a graphical presentation of various waveforms appearing in the receiver of FIG. 3.

The indicating signals provided in the output 198 of the AND gate 196, illustrated by curve H of FIG. 4, are fed to the reset inputs 201 and 202, respectively, of the flip-flops 192 and 193, respectively, and reset said flip-flops to provide a ternary counter. The delay device 194 is utilized because the reset pulse is produced a little later than the indicating signals in the fifth channel.

The input register 131 samples the 100 baud signals transmitted in the first, second, third and fourth channels and received at the input terminals 132, 133, 134 and 135. The first signal of the first channel of the distributing pulses provided by the distributing pulse generator 163 is utilized to first sample the received signals at the input terminals 132, 133, 134 and 135. The results of the first sampling are stored in flip-flops 203, 204, 205 and 206 of the input register 131 until the next sampling, that is, until the next distribution and scanning is commenced, as shown by curves I, J, K and L of FIG. 4. The first signal of the first channel, as shown by curve M of FIG 4, is provided in lead 207 via an AND gate 208, leads 209 and 211 which are connected to the inputs of said AND gate and a polarity inverter 212 connected to the output 213 of the said AND gate. The data signals transmitted in the first, second, third and fourth channels are supplied to the set inputs of the flip-flops 203, 204, 205 and 206 directly via the input terminals 132, 133, 134 and 135, respectively, and are supplied to the reset inputs of said flip-flops via polarity inverters 214, 215, 216 and 217, respectively, connected in leads 218, 219, 221 and 222, respectively.

The scanner 143 scans the flip-flop registers 203, 204, 205 and 206 of the input register 131 in sequence. The scanning operation is accomplished by the output signals produced by the distributing pulse generator 163. The scanner 143 comprises AND gates 223, 224, 225 and 226. The outputs 227, 228, 229 and 231, respectivley, of the AND gates 223, 224, 225 and 226, respectively, are connected to the output terminal 155 via an OR gate 232. The output signals of the distributing pulse generator 163 are supplied to the scanner 143 via leads 233, 211 and 234 and the output terminals 165, 166 and 167 of the distributing pulse generator 163. The sequential scanning of the flip-flops 203, 204, 205 and 206 by the scanner 143 is illustrated by curves N, O, P and Q of FIG. 4, which show the output signals provided in the outputs 227, 228, 229 and 231 of the AND gates 223, 224, 225 and 226. In the curves N, O and P, the broken-line portions indicate a sampling result of zero or no signal and the solid-line portions indicate a sample result of 1 or signal. The 350 baud signal provided at the output terminal 155 of the scanner 143 is shown by curve R of FIG. 4.

The transmitter and receiver of the communication system of the present invention may transmit and receive the b signals via any suitable number of channels and still function without error and with efficiency and reliability. The number of channels utilized for transmission may be considerably greater than four, as described.

In the transmitter, the number of 350 pulse per second pulses in one period between adjacent 100 pulse per second pulses is counted in order to determine whether or not the fourth channel will be utilized for signal transmission. Thus, the necessity for the utilization of the fourth channel is determined only near the end of the period between adjacent 100 pulse per second pulses. In some cases, it is desirable to make the determination in a short time. Thus, for example, if the phase of the 100 pulse per second signals shown by the curve B of FIG. 2 is advanced a small amount relative to the 350 pulse per second signals shown by the curve A of FIG. 2, a more rapid set and reset operation of the flip-flop 108 of the count detector 34 would be required.

FIG. 5 illustrates another embodiment of the count detector 34 of the transmitter of FIG. 1. The count detector 34' of FIG. 5 is an improvement over the count detector 34 and may be set and reset in less time than said count detector 34. The flip-flop 69 and some of the associated circuitry of the signal distributor 11 of FIG. 1 is shown in FIG. 5 in order to show the interconnection of count detector 34' in the transmitter. The count detector 34' comprises a delay device 241, which has an input connected to an input terminal 35', to which the 100 pulse per second *b* clock pulses are supplied, and a flip-flop 108' having set and reset inputs 242 and 243, respectively, connected to the output of the delay device. The set output of the flip-flop 108' is connected to output terminal 37' and the reset output of said flip-flop is connected to output terminal 38'. The 100 pulse per second clock pulses are transferred directly from the input terminal 35' to the output terminal 39'. The set input 244 of the flip-flop 108' is connected to the lead 98 of the signal distributor 11 and the reset input 245 of said flip-flop is connected to the lead 79 via a lead 246.

The delay device 241 has a delay time of 7.14 milliseconds. Since the period between adjacent 100 pulse per second pulses is 10 milliseconds and the period between adjacent 350 pulse per second pulses is 2.86 milliseconds, the delay time of the delay device 241 is less than the period between adjacent 100 pulse per second pulses by the period between adjacent 350 pulse per second pulses.

The count detector 34' of FIG. 5 determines whether or not the fourth channel is to be utilized for data signal transmission in a time which is one period between adjacent 350 pulse per second pulses less than the time for the same determination by the count detector 34 of FIG. 1. In the embodiment of FIG. 1, the determination is made of which of the third and fourth pulses was counted by the flip-flops 68 and 69, whereas in the count detector 34' of FIG. 5, the determination is made of which of the second and third pulses was counted by the flip-flops 68 and 69. The determination of which of the second and third pulses was counted by the flip-flops 68 and 69 enables a determination of which of the third and fourth pulses will be counted at the end of the period between adjacent 100 pulse per second pulses. The time for the determination need not be definite, but may be varied as much as the permissible margin of error in the conversion of the 100 baud signals.

Figure 6:
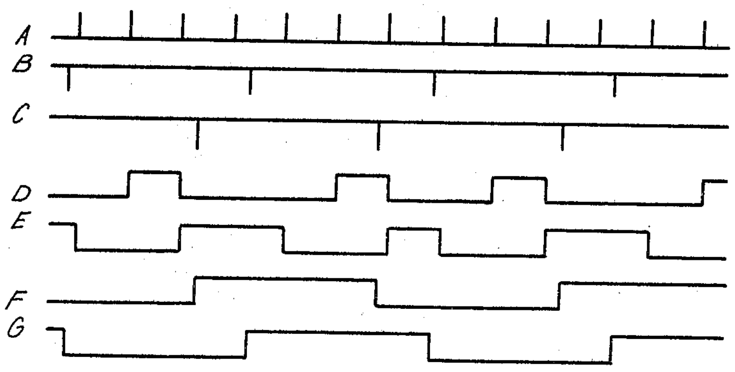
FIG. 6 is a graphical presentation of various waveforms appearing in the count detector of FIG. 5.

Although the determination of whether or not the fourth channel is to be utilized for data signal transmission is accomplished by the count detector 34' in a time which is one period between adjacent 350 pulse per second pulses less, said time may be two periods between adjacent 350 pulse per second pulses less. However, a time which is less by one period provides sufficient time for the circuit operation as well as for the determination. The 350 pulse per second clock pulses are shown by curve A of FIG. 6. The 100 pulse per second clock pulses are shown by curve B of FIG. 6. The output signal of the delay device 241 is shown by curve C of FIG. 6. The output of the flip-flop 68 and the output of the flip-flop 69 (FIG. 1) are illustrated by curves D and E, respectively, of FIG. 6.

When the ternary counter comprising the flip-flops 68 and 69 (FIG. 1) counts the second pulse, the flip-flop 69 produces a zero or no signal at its set output 76, and when said counter counts the third pulse, the flip-flop 69 produces a 1 or signal at its set output 76. The signal or no signal at the set output 76 of the flip-flop 69 is determined by the 100 pulse per second clock pulses which are fed to the set and reset inputs 242 and 243 of the flip-flop 108'. The signal or no signal is then transmitted to the output register 41 (FIG. 1) via the output terminals 37' and 38' under the control of the 100 pulses per second clock pulses.

While the invention has been described by means of specific examples and in specific embodiments, we do not wish to be limited thereto, for obvious modifications will occur to those skilled in the art without departing from the spirit and scope of the invention.

We claim:

1. A communication system for the transmission of a high speed code via a plurality of low speed signal channels, comprising:

transmitter means for transmitting high speed data signals in a plurality of low speed signal channels selected in accordance with the equation $$[b(n-2)] < a < [b(n-1)]$$

where $a$ is the speed in bauds of the high speed data signals, $b$ is the speed in bauds of the low speed signals and $n$ is the number of channels of transmission, said transmitter means including means for transmitting intelligence data in $(n-2)$ of said channels, means for selectively transmitting intelligence data in the $(n-1)^{th}$ of said channels and means for transmitting in the $n^{th}$ of said channels indicating signals indicating the transmission of intelligence data in said $(n-1)^{th}$ channel.

2. A communication system as claimed in claim 1, further comprising means for applying to said transmitter means high speed clock pulses at the speed of said high speed data signals and means for applying to said transmitter means low speed clock pulses at the speed of said low speed signals, and wherein said transmitter means includes means for providing a determined number of high speed clock pulses between each low speed clock pulse and the next succeeding low speed clock pulse and counting means for counting said determined number of high speed clock pulses, said counting means being connected to and controlling said means for selectively transmitting intelligence data in accordance with said determined number of high speed clock pulses.

3. A communication system as claimed in claim 1, further comprising receiver means for receiving the high speed data signals transmitted by the transmitter means in the plurality of low speed signal channels and reproducing said high speed data signals therefrom and means for applying to said receiver means low speed clock pulses at the speed of said low speed signals, said receiver means including first frequency multiplying means for multiplying the speed of said low speed clock pulses by a first factor to provide a first clock pulse at a first frequency, second frequency multiplying means for multiplying the speed of said low speed clock pulses by a second factor to provide a second clock pulse at a second frequency, reproducing means for reproducing said high speed data signals from said signals received from said transmitter means, and switch means connected between said first and second frequency multiplying means and said reproducing means for receiving said $n^{th}$ channel indicating signals from said transmitter means and for selecting and applying to said reproducing means one of said first and second clock pulses to reproduce said high speed data signals in accordance with said indicating signals.

4. A communication system as claimed in claim 2, wherein the counting means of said transmitter means comprises counter means, delay means connected to said counter means and means for applying said low speed clock pulses to said counter means through said delay means.

5. A communication system for the transmission of a high speed code via a plurality of low speed signal channels, comprising:

transmitter means for transmitting high speed data signals in a plurality of low speed signal channels selected in accordance with the equation $$[b(n-3)]<a<[b(n-1)]$$

where $a$ is the speed in bauds of the high speed data signals, $b$ is the speed in bauds of the low speed signals and $n$ is the number of channels of transmission, said transmitter means including means for transmitting intelligence data in $(n-3)$ of said channels, means for selectively transmitting intelligence data in the $(n-2)^{th}$ and in the $(n-1)^{th}$ of said channels and means for transmitting in the $n^{th}$ of said channels indicating signals indicating the transmission of intelligence data in said $(n-2)^{th}$ and $(n-1)^{th}$ channels.

6. A communication system as claimed in claim 5, further comprising means for applying to said transmitter means high speed clock pulses at the speed of said high speed data signals and means for applying to said transmitter means low speed clock pulses at the speed of said low speed signals, and wherein said transmitter means includes means for providing a determined number of high speed clock pulses between each low speed clock pulse and the next succeeding low speed clock pulse and counting means for counting said determined number of high speed clock pulses, said counting means being connected to and controlling said means for selectively transmitting intelligence data in accordance with said determined number of high speed clock pulses.

7. A communication system as claimed in claim 5, further comprising receiver means for receiving the high speed data signals transmitted by the transmitter means in the plurality of low speed signal channels and reproducing said high speed data signals therefrom and means for applying to said receiver means low speed clock pulses at the speed of said low speed signals, said receiver means including first frequency multiplying means for multiplying the speed of said low speed clock pulses by a first factor to provide a first clock pulse at a first frequency, second frequency multiplying means for multiplying the speed of said low speed clock pulses by a second factor to provide a second clock pulse at a second frequency, reproducing means for reproducing said high speed data signals from said signals received from said transmitter means, and switch means connected between said first and second frequency multiplying means and said reproduring means for receiving said $n^{th}$ channel indicating signals from said transmitter means and for selecting and applying to said reproducing means one of said first and second clock pulses to reproduce said high speed data signals in accordance with said indicating signals.

8. A communication method for the transmission of a high speed code via a plurality of low speed signal channels, comprising the steps of:

transmitting high speed data signals in a plurality of low speed signal channels selected in accordance with the equation $$[b(n-2)]<a<[b(n-1)]$$

where $a$ is the speed in bauds of the high seped data signals, $b$ is the speed in bauds of the low speed signals and $n$ is the number of channels of transmission;

transmitting intelligence data in $(n-2)$ of said channels;

selectively transmitting intelligence data in the $(n-1)^{th}$ of said channels; and transmitting in the $n^{th}$ of said channels indicating signals indicating the transmission of intelligence data in said $(n-1)^{th}$ channel.

9. A communication method as claimed in claim 8, further comprising the steps of providing a determined number of high speed clock pulses at the speed of said high speed data signals between each of a plurality of low speed clock pulses at the speed of said low speed signals and the next succeeding low speed clock pulse, counting the determined number of high speed clock pulses, and controlling the selective transmission of intelligence data in accordance with said determined number of high speed clock pulses.

10. A communication method as claimed in claim 8, further comprising the steps of receiving the high speed data signals transmitted in the plurality of low speed signal channels, frequency multiplying the speed of low speed clock pulses initially at the speed of said low speed signals by a first factor to provide a first clock pulse at a first frequency, frequency multiplying the speed of said low speed clock pulses by a second factor to provide a second clock pulse at a second frequency, receiving said $n^{th}$ channel indicating signals, selecting one of the first and second clock pulses in accordance with said received indicating signals, and reproducing said high speed data signals from said received signals by utilizing the selected one of said first and second clock pulses.

11. A communication method as claimed in claim 9, further comprising the steps of controlling the counting of the determined number of high speed clock pulses by said low speed clock pulses and delaying said low speed clock pulses prior to controlilng the counting therewith.

12. A communication method for the transmission of a high speed code via a plurality of low speed signal channels, comprising the steps of:

transmitting high speed data signals in a plurality of low speed signal channels selected in accordance with the equation $$[b(n-3)]<\alpha<[(bn-1)]$$

where $a$ is the speed in bauds of the high speed data signals, $b$ is the speed in bauds of the low speed signals and $n$ is the number of channels of transmission;

transmitting intelligence data in $(n-3)$ of said channels:

selectively transmitting intelligence data in the $(n-2)^{th}$ and in the $(n-1)^{th}$ of said channels; and transmitting in the $n^{th}$ of said channels indicating signals indicating the transmission of intelligence data in said $(n-2)^{th}$ and $(n-1)^{th}$ channels.

References Cited

UNITED STATES PATENTS 3,159,720 12/1964 Bergmann.

RALPH D. BLAKESLEE, Primary Examiner

U.S. Cl. X.R.

325—44